United States Patent [19]
Kirchner et al.

[11] B 3,923,967
[45] Dec. 2, 1975

[54] PRODUCTION OF HYDROGEN PEROXIDE USING THE ANTHRAQUINONE PROCESS

[75] Inventors: Jack R. Kirchner; Lawrence G. Vaughan, both of Wilmington, Del.

[73] Assignee: E. I. Du Pont de Nemours and Company, Wilmington, Del.

[22] Filed: Jan. 12, 1973

[21] Appl. No.: 323,127

[44] Published under the Trial Voluntary Protest Program on January 28, 1975 as document no. B 323,127.

Related U.S. Application Data

[63] Continuation of Ser. No. 79,643, Oct. 9, 1970, abandoned.

[52] U.S. Cl. .................... 423/588; 260/369
[51] Int. Cl.² ........................... C01B 15/02
[58] Field of Search ............ 423/588, 589; 260/369

[56] References Cited
UNITED STATES PATENTS

| | | | |
|---|---|---|---|
| 2,668,753 | 2/1954 | Harris | 423/588 |
| 3,032,560 | 5/1962 | Dawsey | 260/369 |
| 3,767,779 | 10/1973 | Coingt | 423/589 |
| 3,778,452 | 12/1973 | Josey et al. | 423/588 |

FOREIGN PATENTS OR APPLICATIONS

| | | | |
|---|---|---|---|
| 614,296 | 2/1961 | Canada | 260/369 |
| 607,627 | 11/1960 | Canada | 423/589 |

*Primary Examiner*—Oscar R. Vertiz
*Assistant Examiner*—Eugene T. Wheelock

[57] ABSTRACT

An improvement in the cyclic process for producing hydrogen peroxide from anthraquinones is obtained by employing as a working intermediate a 5,6,7,8-tetrahydro-1-alkyl-9,10-anthraquinone of the formula

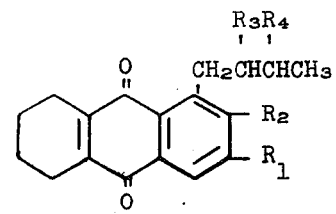

wherein each of $R_1$, $R_2$, $R_3$ and $R_4$ is either hydrogen or a 1 to 8 carbon straight chain alkyl hydrocarbon group. The working intermediate is employed in a water immiscible solvent. The disclosed 5,6,7,8-tetrahydro-1-alkyl-9,10-anthraquinones exhibit excellent solubilities in both the anthraquinone and anthrahydroquinone forms, thereby allowing high hydrogen peroxide productivities per cycle and relatively concentrated extract hydrogen peroxide solutions.

4 Claims, No Drawings

PRODUCTION OF HYDROGEN PEROXIDE USING THE ANTHRAQUINONE PROCESS

CROSS-REFERENCES TO RELATED APPLICATIONS

This is a continuation of application Ser. No. 79,643, filed Oct. 9, 1970, now abandoned.

The application of Josey and Kirchner, Ser. No. 79,642, filed on Oct. 9, 1970, now U.S. Pat. No. 3,778,452, discloses 1-alkenyl-9,10-anthraquinones and methods for their preparation, which alkenylanthraquinones are usable as -alkenylanthraquinones materials in preparing some of the tetrahydro-1-alkylantraquinones of the present invention.

The application of Josey and Kirchner, Ser. No. 79,644, filed on Oct. 9, 1970, now abandoned, discloses certain alkyl substituted 1,3,7-octatrienes and their preparation, which octatrienes are used in the preparation of the 1-alkenylantraquinones of the above application of Josey and Kirchner, Ser. No.79,642.

BACKGROUND OF THE INVENTION

1. Field of the Invention

This invention relates to certain tetrahydro-1-alkylanthraquinones, to their preparation and to their use as working intermediates in cyclic reduction-oxidation anthraquinone processes for producing hydrogen peroxide.

2. Prior Art

The use of alkylanthraquinones and/or their tetrahydro derivatives as working intermediates in cyclic reduction-oxidation processes for producing hydrogen peroxide is well known. In such processes, commonly referred to as anthraquinone processes, the working intermediate or mixture of two or more thereof is dissolved in a suitable water immiscible solvent or mixture of solvents and the solution is alternately reduced and oxidized. In the reduction stage, the working intermediate is hydrogenated in the presence of a suitable catalyst to reduce it to its anthrahydroquinone form. In the subsequent oxidation stage, the intermediate is reoxidized with molecular oxygen, e.g., in the form of air, to reform the anthraquinone and simultaneously produce hydrogen peroxide. The hydrogen peroxide is then removed from the working solution, generally by extraction with water, and the residual anthraquinone working solution is recycled to the reduction stage for a repetition of the cycle.

Catalysts employed in the reduction stage of such processes are the "platinum group" metals such as ruthenium, rhodium, palladium, osmium, iridium and platinum, and Raney nickel. The most commonly proposed catalysts are metallic palladium, generally used on a support such as activated alumina, activated magnesia, aluminosilicates, titanium dioxide, an alkaline earth metal carbonate such as dolomite, and ion exchange resins; and Raney nickel.

The most generally proposed working intermediates are 2-ethylanthraquinone, 2-t-butylanthraquinone, the 2-amylanthraquinones and 1,3-diethylanthraquinone. Such anthraquinones tend to become hydrogenated in the nucleus during use and although the resulting tetrahydroderivatives also produce hydrogen peroxide in the cycle, it has generally been preferred to operate with only a minor amount of the anthraquinone in the tetrahydro form.

In use, the working intermediate is dissolved in a water immiscible solvent. Generally, a mixture of solvents is used, one of which is a good solvent for the anthraquinone form of the intermediate and the other a good solvent for the anthrahydroquinone form. Examples of the first type of solvents are the $C_8$ to $C_{17}$ ketones, anisole, benzene, xylene, trimethylbenzene, methylnaphthalene and the like. Examples of the second type are the $C_5$ to $C_{12}$ alcohols such as diisobutylcarbinol and heptyl alcohol, methylcyclohexanol acetate, and phosphoric acid esters such as trioctyl phosphate.

Ferri Canadian Pat. No. 614,296, issued Feb. 7, 1961, and the following U.S. Pat. Nos. (whose issue dates are shown in parentheses) are representative of the many issued patents relating to anthraquinone processes for producing hydrogen peroxide: Reidl et al. 2,158,525 (5/16/39) and 2,215,883 (9/24/40); Dawsey et al. 2,537,655 (1/9/51), Sprauer 2,657,980 (11/3/53), Harris et al. 2,668,753 (2/9/54) and Hinegardner 2,689,169 (9/14/54); and Darbee et al. 3,062,622 (11/6/62), Hiratsuka et al. 3,038,786 (6/12/62), Dawsey 3,041,143 (6/26/62), Kabisch 3,328,128 (6/27/67), Kabisch et al. 3,488,150 (1/6/70) and Logan et al. 3,493,343 (2/3/70).

As is recognized in such issued patents, it is important in commercial operations of such anthraquinone processes that the working solution employed have a high hydrogen peroxide synthesis capacity per cycle and that the hydrogen peroxide solution obtained in the extraction step be relatively concentrated. The synthesis capacity per cycle is determined largely by the solubility of the working intermediate employed, particularly in its anthrahydroquinone form, and of course also by the particular solvent or solvent mixture used, which factors also determine the maximum concentration of hydrogen peroxide obtainable in the extract product solution. It has now been discovered that certain tetrahydro-1-alkyl-anthraquinones exhibit outstanding solubilities in both their anthraquinone and anthrahydroquinone forms in working solvents of the types commonly used, and that such anthraquinones are, therefore, particularly well suited for use in cyclic anthraquinone processes for producing hydrogen peroxide. Thus, their high solubilities permit the use of working solutions at substantially greater anthraquinone concentrations than were heretofore practical, with consequent higher synthesis capacities per cycle and relatively concentrated hydrogen peroxide extract products.

SUMMARY OF THE INVENTION

One embodiment of the invention is a cyclic reduction-oxidation anthraquinone method for producing hydrogen peroxide employing as the working intermediate a 5,6,7,8-tetrahydro-1-alkyl-9,10-anthraquinone of Formula III

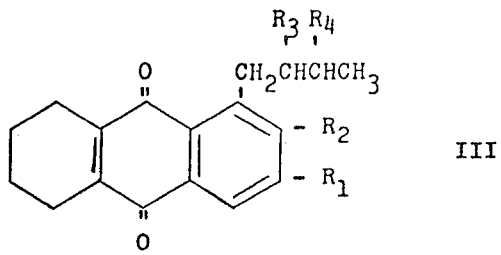

in which each of $R_1$, $R_2$, $R_3$ and $R_4$ is either hydrogen or a 1 to 8 carbon straight chain alkyl hydrocarbon group.

Another embodiment of the invention is a solution of a tetrahydro-1-alkylanthraquinone of the above Formula III in a water-immiscible solvent, which solution is suitable for use as the working solution in an anthraquinone process for producing hydrogen peroxide.

A further embodiment of the invention is a 1-alkyl-9,10-anthraquinone of Formula II

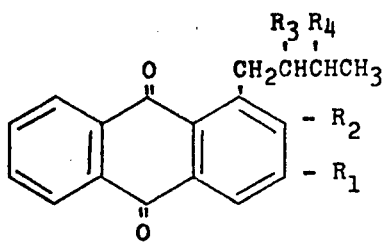

in which each of $R_1$, $R_2$, $R_3$ and $R_4$ is as defined above.

DETAILED DESCRIPTION AND PREFERRED EMBODIMENTS

The reactions for preparing the new anthraquinone derivatives of the invention, i.e., the 1-alkyl-9,10-anthraquinones of Formula II and the 5,6,7,8-tetrahydro-1-alkyl-9,10-anthraquinones of Formula III, are as follows:

are those of the platinum metal group and of these, the most preferred catalysts are palladium and platinum. The catalysts may be supported or not and may be supplied in the form of the metal or as a compound thereof, e.g., the oxide, the chloride or the acetate, in which case the compound will be reduced in situ to the active metal catalyst. Catalyst concentrations, calculated as the metal and based upon the weight of the Formula Ia or Ib compound to be hydrogenated, ranging from about 0.01 to 100 percent are generally suitable. The preferred concentrations range from 0.5 to 10 percent. Any organic solvent which is inert under the reaction conditions and which will dissolve the compounds to be hydrogenated under the conditions of use can be employed. Illustrative of such solvents are the hydrocarbons such as benzene, cyclohexane and pentane; the ethers such as diethyl ether, tetrahydrofuran and dioxane; the esters such as methyl acetate and ethyl acetate; the alcohols such as methanol, ethanol and isopropanol; and the ketones such as acetone and methyl ethyl ketone.

HYdrogenation of a Formula Ia or Ib compound as indicated above saturates the 1-alkenyl substituent group of the starting compound, thereby forming a compound of Formula II. Further hydrogenation of a solution of the latter at a temperature of about 20° to 125°C., preferably 40° to 100°C., under a hydrogen pressure of about 0.5 to 100, preferably 1 to 50, atmo-

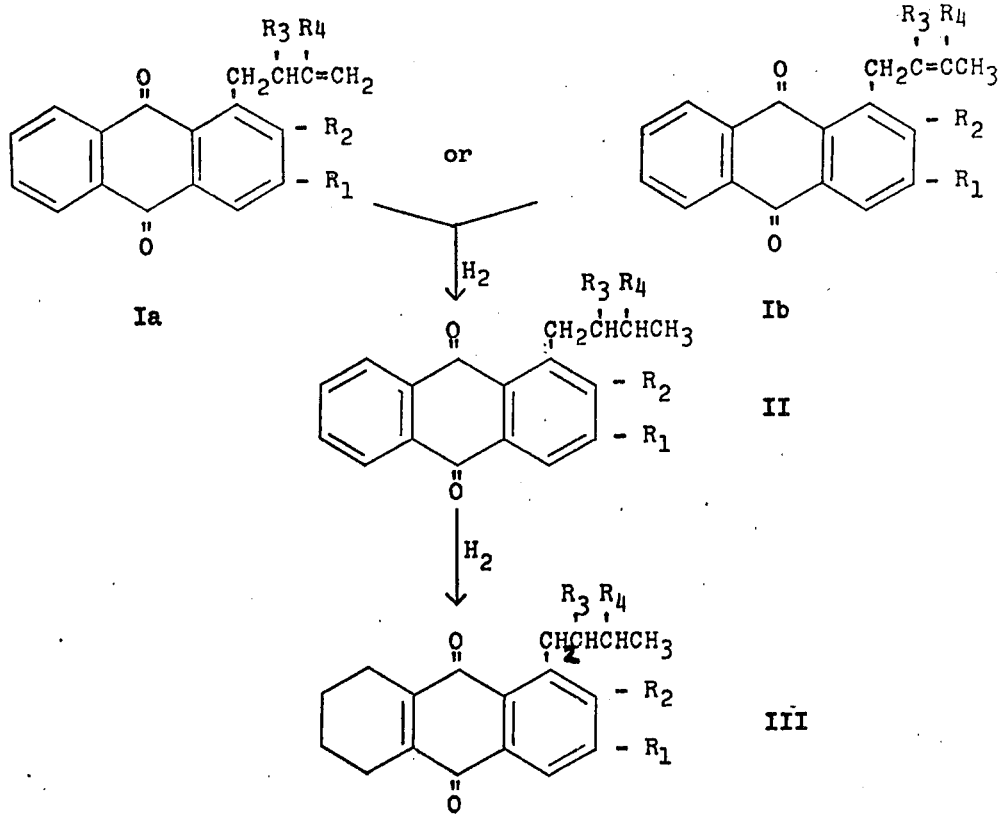

The reaction to produce a compound of Formula II is carried out by hydrogenating a solution of a compound of Formula Ia or Formula Ib at a temperature of from about 0° to 100°C., preferably 20° to 50°C., in the presence of a Group VIII transition metal catalyst and under a hydrogen pressure of from about 0.5 to 20, preferably 1 to 5, atmospheres. The preferred catalysts spheres in the presence of a platinum group metal or a Raney nickel catalyst, effects the saturation of one of the anthraquinones rings to yield a 5,6,7,8-tetrahydro-1-alkyl-9,10-anthraquinone of Formula III. While a platinum group metal (ruthenium, rhodium, palladium osmium, iridium or platinum) catalyst can be used for this hydrogenation, the desired ring hydrogenation occurs more slowly therewith than when Raney nickel is used which is the preferred catalyst. Any of the solvents disclosed above as suitable for use in the hydrogenation of the Formula I*a* and I*b* compounds can be used when hydrogenating the Formula II compounds.

The starting Formula I*a* compounds can be readily prepared by effecting a Diels-Alder condensation between 1,4-naphthoquinone and a 1,3,7-octatriene of the formula

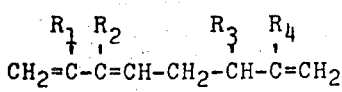

in which each of $R_1$, $R_2$, $R_3$ and $R_4$ is hydrogen or a 1 to 8 carbon straight chain alkyl hydrocarbon group. The condensation is effected by heating the reactants together at 75° to 125°C. The resulting adduct products are 1,4,4*a*,9*a*-tetrahydro-1-(3-butenyl)-9,10-anthraquinones which are readily converted to Formula I*a* compounds by oxidation with air in the presence of a strong base such as potassium hydroxide in an aqueous ethanol medium. Conversion of the Formula I*a* compounds to Formula I*b* compounds is readily accomplished by heating a solution of the Formula I*a* compound in benzene under reflux in the presence of a strong acid such as p-toluene sulfonic acid.

The preparations of compounds of Formulas I*a* and I*b* as indicated above is more fully described in the application of Josey and Kirchner, Ser. No. 79,642, filed on Oct. 9, 1970, now U.S. Pat. No. 3,778,452.

The 1,3,7-octatrienes employed in the preparation of the Formula I*a* compounds can be readily prepared by the homodimerization of a 1,3-butadiene of the formula

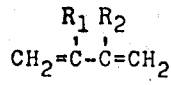

in which each of $R_1$ and $R_2$ is either hydrogen or a 1 to 8 carbon straight chain hydrocarbon alkyl group, or by the codimerization of two such compounds. Such homodimerization and codimerization reactions can be effected by heating a solution of the chosen monomeric compounds in acetone at temperatures of 75° to 125°C. Under autogenous pressure in the presence of 0.5 to 2 percent by weight, based on the weight of the reaction mixture of bis(triphenylphosphine)(maleic anhydride)-palladium which catalyzes such reactions.

The preparation of such 1,3,7-octatrienes as indicated above is more fully described in the application of Josey and Kirchner, Ser. No. 79,644, filed on Oct. 9, 1970, now abandoned.

As indicated in the patents cited above, it is generally preferred in most anthraquinone hydrogen peroxide processes to employ an alkylanthraquinone, rather than the corresponding tetrahydroanthraquinone, as the working intermediate, although the working solution will usually also contain some of the corresponding tetrahydro compound in minor amount. In contrast to the 2-alkylanthraquinones heretofore generally preferred, the present 1-alkylanthraquinones of Formula II are of limited value for use as working intermediates since only low yields of hydrogen peroxide are obtained when they are used due to extensive conversion thereof to by-products which are inactive in the cycle to produce hydrogen peroxide. Surprisingly, when the tetrahydro-1-alkylanthraquinones of Formula III are used as working intermedates, they produce hydrogen peroxide in high yield. Moreover, they exhibit outstandingly high solubilities, particularly in their anthrahydroquinone forms, and thus can be used at high concentrations in the working solution with consequent high hydrogen peroxide productivities per cycle permitting the obtainment of relatively concentrated extract peroxide solutions.

The present tetrahydro-1-alkylanthraquinones exhibit excellent solubilities in essentially all of the water immiscible solvents or solvent mixtures commonly regarded as suitable in formulating working solutions and the solubilities in such solvents of the anthrahydroquinone forms of such compounds are particularly outstanding. Since in cyclic anthraquinone hydrogen peroxide processes, the maximum permissible concentration of the working intermediate is generally limited by the solubility of its anthrahydroquinone form, the significance of the high solubilities of the anthrahydroquinone forms of the present tetrahydro-1-alkylanthraquinones is readily apparent.

As indicated, working solutions can be formulated by dissolving one or more of the tetrahydro-1-alkylanthraquinones of Formula III in any of the water immiscible solvents or mixtures of solvents commonly used in preparing such working solutions. Examples of such solvents and solvent mixture are those disclosed in the patents cited above. These usually will consist of mixtures of solvents, one of which is a good solvent for the anthraquinone form of the intermediate and one which is a good solvent for the anthrahydroquinone form. Preferred solvent components for the anthraquinone form are xylene, trialkylbenzenes such as trimethylbenzene and the monomethyl and dimethyl naphthalenes. Preferred solvent components for the anthrahydroquinone form are the $C_7$ to $C_{11}$ aliphatic alcohols such as diisobutylcarbinol and heptyl alcohol, the acetates and propionates of cyclohexanol and methylcyclohexanol, and the organic triesters of phosphoric acid such as tributyl phosphate, tricresyl phosphate and trioctyl phosphate. Preferred mixed solvents are mixtures, on a weight percentage basis, of from about 80 to 50 percent of one or more of the above preferred solvent components for the anthraquinone form and about 20 to 50 percent of one or more of the above preferred solvent components for the anthrahydroquinone form. As a matter of fact, the anthrahydroquinone forms of the present tetrahydro-1-alkylanthraquinones are sufficiently soluble in those solvents which are normally regarded as solvents for the anthraquinone forms of the intermediates that high peroxide synthesis capacity working solutions can readily be formulated using working solvents such as xylene, trimethylbenzene and methylnaphthalene as sole solvents, i.e., in the absence of any solvent of the type normally used in solvent mixtures as solvents for the anthrahydroquinone form.

Working solution of the tetrahydro-1-alkylanthraquinones of Formula III can be used in cyclic reduction-oxidation processes for producing hydrogen peroxide under any of the conditions heretofore proposed for operating such processes. As in all such processes, the reduction or hydrogenation stage, in which the anthraquinone intermediate is converted to its anthrahydroquinone form, will be carried out in the presence of a hydrogenation catalyst which may be suspended in the working solution during the hydrogenation or may be used in the form of a fixed-bed through which the working solution and hydrogen are passed. Examples of suitable catalysts are the platinum group metals (ruthenium, rhodium, palladium, osmium, iridium and platinum; or mixtures of two or more thereof) and Ramey nickel. The catalyst is used in particulate form. The platinum group metal catalysts may be used in their unsupported or supported forms, the latter being generally preferred. Suitable support or carrier materials for the platinum group metal catalysts are any of those commonly used for such catalysts, illustrative of which are activated alumina, activated magnesia, aluminosilicates, titania, alkali metal carbonates such as dolomite, and ion exchange resins.

The conditions respecting temperature and hydrogen pressure under which hydrogenation of the working solution is carried out in the presence of a catalyst of the above type is carried out are not critical and those temperature and pressure conditions heretofore proposed can be used. Generally, temperatures ranging from about room temperature to about 100°C. and hydrogen pressures ranging from about atmospheric pressure to about 6 atmospheres generally will be used. The preferred temperatures range from 40° to 80°C. and the preferred hydrogen pressures range from 1 to 3 atmospheres.

Following reduction of the working solution, the catalyst is removed, e.g., by filtration, and the solution is oxidized in the oxidation stage with molecular oxygen, e.g., air, whereby the reduced working intermediate is reconverted to its anthraquinone form and hydrogen peroxide is simultaneously produced. The oxidation will generally be carried out using air as the source of oxygen at a temperature of from about room temperature to 80°C. and an oxygen partial pressure of from 0.1 to 10 atmospheres, although these conditions are not critical. The preferred temperatures range from 40° to 70°C. and the preferred partial pressures of oxygen range from 0.2 to 3 atmospheres.

The hydrogen peroxide formed in the oxidation stage can be removed from the working solution in any desired manner. One way is to distill the hydrogen peroxide from the oxidized working solution, e.g., under reduced pressure. A more practical and preferred way for removing the hydrogen peroxide is by extraction with water, thereby to obtain an aqueous solution of hydrogen peroxide as product. Such extraction methods for recovering the hydrogen peroxide product are well known and have been widely used. Following removal of the hydrogen peroxide from the working solution, the latter is returned to the hydrogenation stage of the cycle.

The invention is illustrated by the following examples in which all parts, proportions and compositions expressed as percentages are by weight, unless stated otherwise.

EXAMPLE 1

To a solution of 17 grams (0.065 gram mole) of 1-(3-butenyl)anthraquinone in 200 ml. of benzene, there was added 200 mg. of a commercial finely divided palladium-on-charcoal catalyst containing 10 percent metallic palladium. The mixture was hydrogenated at room temperature and a hydrogen pressure of 40 psig., whereby the theoretical amount of hydrogen required to saturate the butenyl substituent group was absorbed. The resulting mixture was filtered and the benzene was evaporated from the filtrate on the steam bath. The residue was chromatographed on basic alumina using benzene as the eluant. After removing benzene from the eluate under high vacuum, the resulting residue was recrystallized from hexane to give 6.7 grams (39 percent yield) of product which was 1-n-butyl-9,10-anthraquinone, m.p. 88.5°–90°C.

Anal. Calcd for $C_{18}H_{16}O_2$: C, 81.79%; H, 6.10%.
Found: C, 81.78%; H, 6.09%.

The chemical structure of the product was established by its nuclear magnetic resonance (NMR) spectrum ($CDCl_3$), in which signals occurred at 8.0–8.3 (multiplets, 3H), 7.4–7.9 (multiplets, 4H), 3.21 (broad triplet, 2H), 0.7–1.9 ppm (multiplets, 7H).

EXAMPLE 2

To a solution of 19.4 grams (0.061 gram mole) of 1-(3-ethyl-3-butenyl)-3-ethylanthraquinone in 300 ml. of cyclohexane, there was added 0.4 gram of a finely divided palladium-on-charcoal catalyst containing 10 percent metallic palladium and 100 mg. platinum oxide ($PtO_2$). The mixture was hydrogenated at room temperature and a hydrogen pressure of 33 psig. for 20 hours. The resulting mixture was filtered and cyclohexane was evaporated from the filtrate on the steam bath. The residue was chromatographed on basic alumina using a 3:1 volume mixture of benzene and cyclohexane as eluant. Evaporation of the solvent from the eluate left 9.8 grams of crude product (50 percent yield). Since an NMR spectrum of the crude product revealed that saturation of the ethyl butenyl substituent group was only 90 percent complete, the crude product was dissolved in methanol and hydrogenated at room temperature for two days in the presence of 1.0 grams of a platinum-on-charcoal catalyst containing 5 percent metallic platinum. The mixture was then filtered and the methanol evaporated from the filtrate on the steam bath. The residue was chromatographed on basic alumina using cyclohexane as the eluant. After evaporation of the solvent from the eluate on the steam bath, the residue was recrystallized from isopropanol to give an analytically pure product, m.p. 80.5–81.5°C., which was 1-(3-methylpentyl)-3-ethyl-9,10-anthraquinone.

Anal. Calcd for $C_{22}H_{24}O_2$: C, 82.46%; H, 7.55%.
Found: C, 82.32%; H, 7.31%.

The chemical structure of the product was established by its NMR spectrum ($CDcl_3$), in which signals occurred at 8.0–8.3 (multiplet, 3H), 7.60–7.85 (multiplet, 2H), 7.34 (doublet, J=2.0 cps., 1H), 3.21 (broad triplet, J=7.0 cps., 2H), 2.78 (quartet, J=7.5 cps., 2H), and 0.70–1.90 ppm. (complex multiplets, 14H). A distinct triplet (J=7.5 cps.) was discernible in the final signal complex at 1.30 ppm.

EXAMPLE 3

To a solution of 41.4 grams (0.143 gram mole) of 1-(1-(-isopentenyl)-3-methylanthroquinone in 300 ml. of benzene, there was added 1.0 gram of a finely divided palladium-on-charcoal catalyst containing 10 percent metallic palladium. The mixture was shaken for 4 hours at room temperature under 46 psig. hydrogen. Since no hydrogen uptake occurred, 0.50 gram of platinum oxide ($PtO_2$) was added and the mixture was again shaken under the same conditions for an additional 3 hours with the result that the amount of hydrogen theoretically required to saturate the isopentenyl substituent group was taken up. The resulting mixture was filtered and the filtrate was chromatographed on basic alumina using benzene as the eluant. After evaporating the solvent from the eluate on the steam bath, the residue was recrystalized from isopropanol to give 25.7 grams (62 percent yield) of pure product, m.p. 76°–79°C., which was 1-isopentyl-3-methyl-9,10-anthraquinone.

Anal. Calcd for $C_{20}H_{20}O_2$: C, 82.16%; H, 6.89%.

Found: C, 82.04%; H, 6.88%.

The chemical structure of the product was established by its NMR spectrum ($CDCl_3$), in which signals occurred at 7.2–8.3 (multiplets, 6H), 3.0–3.3 (multiplets, 2H), 2.42 (singlet, 3H), 1.20–1.85 (multiplets, 3H), 1.02 ppm (doublet, J=6.0 cps., 6H).

EXAMPLE 4

To a solution of 34.0 grams (0.116 gram mole) of 1-isopentyl-3-methylanthraquinone (prepared according to the method of Example 3) in 700 ml. of dioxane, there was added one teaspoonful of Raney nickel catalyst. The mixture was stirred then heated to 55°C. and hydrogen gas was bubbled therethrough for 20 hours. The catalyst was then filtered from the mixture. The filtrate, after passing a slow stream of air therethrough for about 3 hours, was poured into four liters of water and the resulting mixture was stirred overnight. The water layer was then decanted and the oily residue was dissolved in 100 ml. of benzene. The benzene solution was chromatographed on basic alumina and the solvent was evaporated from the eluate on the steam bath to give 15.6grams (45 percent yield) of crude, 5,6,7,8-tetrahydro-1-isopentyl-3-methyl-9,10-anthraquinone. An analytical sample, after recrystallization from methanol, had a melting point of 67°–69°C.

Anal. Calcd for $C_{20}H_{24}O_2$: C, 81.05%; H, 8.16%.

Found: C, 80.88%; H, 8.06%.

The chemical strucutre of the product was established by its NMR spectrum ($CDCl_3$), in which signals occurred at 7.75 (singlet, 1H), 7.22 (singlet, 1H), 3.09 (triplet, J=8.0 cps., 2H), 2.20–2.70 (complex multiplets, 7H), 1.20–1.90 (complex multiplets, 7H), 1.00 ppm (doublet, J=5.5 cps., 6H).

EXAMPLE 5

To a solution of 7.7 grams (0.024 gram mole) of 1-(3-methylpentyl)-3-ethylanthraquinone in 200 ml. of dioxane there was added one teaspoonful of Raney nickel catalyst. The mixture was heated to 60°C. and hydrogen was bubbled through the mixture for 18 hours. the catalyst was filtered from the mixture, and a slow stream of air was blown through the filtrate for 3 hours, after which most of the solvent was removed on the steam bath. The residue was poured into 400 ml. of water and the organic products were extracted from the resulting mixture with 200 ml., 50 ml. and 50 ml. portions of hexane. The combined hexane extracts were dried over sodium carbonate, then filtered. After evaporating the hexane from the filtrate on the steam bath, the residue was chromatographed on Florisil, a magnesium silicate adsorbent, using first cyclohexane, then a 1:1 cyclohexane-benzene mixture as the eluant. Removal of the solvent left as product 1.6 grams (20.5 percent yield) of a yellow oil, which was 5,6,7,8-tetrahydro- 1-(3-methylpentyl)-3-ethyl-9,10-anthraquinone.

Anal. Calcd. for $C_{22}H_{28}O_2$: C, 81.44%; H, 8.70%.

Found: C, 81.32%; H, 8.67%.

The chemical structure of the product was established by its NMR spectrum ($CCl_4$), in which the two aromatic protons occurred as doublets (J=1.5 cps.) at 7.69 and 7.15 ppm. and complex multiplets occurred from 2.2–3.2 ppm (8H) and from 0.6–2.0 ppm. (18H).

EXAMPLE 6

The solubilities of various anthraquinones in a 60:40 percent p-xylene:diisobutylcarbanol mixture at 30°C. are reported in Table 1. The solubilities were determined by stirring an excess of the anthaquinone in the solvent mixture at 30°C. for 48 hours, filtering the resulting mixture through a sintered glass filter to remove undissolved anthraquinone, stripping solvent from a weighed sample of the filtrate under high vacuum and a heat lamp, then weighing the resulting anthraquinone residues. The solubility, expressed as a weight percentage, based upon the weight of the solution [wt. of dissolved anthraquinone/wt. of solution × 100], was then calculated. All of the tetrahydro (TH) compounds indicated in Table 1 are 5,6,7,8-tetrahydroanthraquinones.

TABLE 1

ANTHRAQUINONE SOLUBILITIES AT 30°C. IN 60:40 p-XYLENE:DIISOBUTYLCARBINOL MIXTURES

| Test No. | Anthraquinone | Solubility, % by wt. |
|---|---|---|
| 1 | 2-t-butyl | 26.61 |
| 2 | 2-ethyl | 25.64 |
| 3 | TH-2-t-butyl | 6.67 |
| 4 | TH-2-ethyl | 11.32 |
| 5 | 1-n-butyl | 21.43 |
| 6 | 1-isopentyl-3-methyl | 25.78 |
| 7 | 1-(3-methylpentyl)-3-ethyl | 38.18 |
| 8 | TH-1-isopentyl-3-methyl | 33.70 |
| 9 | TH-1-(3-methylpentyl)-3-ethyl | >50 |

The above data show that the 1-alkylanthraquinones of the invention corresponding to Formulas II and III have solubilities in a 60:40 p-xylene:diisobutylcarbinol mixture, which is a typical working solvent mixture, which compare favorably with the solubilities of the two 2-alkylanthraquinones shown which have been used commercially as working intermediates in producing hydrogen peroxide. On the other hand, the tetrahydro-1-alkylanthraquinones (Test Nos. 8 and 9) were much, more soluble than the tetrahydro-2-alkylanthraqinones (Test Nos. 3 and 4).

EXAMPLE 7

The solubilities of various tetrahydroanthrahydroquinones (TH anthrahydroquinones) in various solvents and solvent mixtures are reported in Tabel 2. The solubilities were determined as follows: A weighed amount of the parent tetrahydroanthraquinone was placed in a flask (provided with a magnetic stirrer) together with weighed amounts of a hydrogenation catalyst (0.45 percent palladium on activated alumina) and the solvent. The mixture was then hydrogenated until a full equivalent of hydrogen had been absorbed, thereby converting the anthraquinone completely to the corresponding anthrahydroquinone. Sufficient diethyl ether was added near the end of the hydrogenation to dissolve any precipitated anthrahydroquinone. The mixture was then filtered (under hydrogen) to remove the catalyst and the ether was removed from the filtrate under reduced pressure. When the ether-free filtrate contained precipitated anthrahydroquinone, it was slowly warmed (1°C. temperature rise per minute) until the precipitated anthrahydroquinone dissolved, at which point, the temperature (i.e., the saturation temperature) was noted and the solubility of the anthrahydroquinone at that temperature was calculated. When the ether-free filtrate did not contain precipitated anthrahydroquinone, it was cooled until precipitation did occur, following which it was slowly warmed and the saturation temperature and solubility at that temperature were determined as indicated. The solubilities reported in Table 2 are expressed as weight percentages, based upon the weight of the solution. In Table 2, the solvents used were:
Solvent A: p-xylene
Solvent B: anisole
Solvent C: methylnaphthalene
Solvent D: mixture of 90% methylnaphalene, 10% diisobutylcarbinol
Solvent E: mixture of 90% methylnaphthalene, 10% methylcyclohexyl acetate
Solvent F: mixture of 90% p-xylene, 10% trioctyl phosphate.

anthrahydroquinone is most soluble. However, as can be seen from the data of Table 2 (Test Nos. 13, 14, 15 and 19), the compounds of Formula III have outstanding solubilities in single solvents such as p-xylene, anisole and methylnaphthalene, which are solvents of the type generally regarded as being good solvents for anthraquinones but relatively poor solvents for anthrahydroquinones.

EXAMPLE 8

Weighed samples (about 1 gram each) of various 1-alkylanthraquinones of Formula II and of various tetrahydro-1-alkylanthraquinones of Formula III were dissolved in about 10–20 grams of solvent and to each resulting solution there was added about 1.0 gram of a palladium-on-alumina catalyst (0.45 percent palladium). In each case, the resulting mixture was hydroge-

TABLE 2

ANTHRAHYDROQUINONE SOLUBILITIES

| Test No. | Anthrahydroquinone | Solvent | Sat. Temp., °C. | Solubility at Sat. Temp., % |
|---|---|---|---|---|
| 1 | TH-2-t-butyl | A | 58 | 5.63 |
| 2 | TH-2-t-butyl | B | − 3 | 4.85 |
| 3 | TH-2-t-butyl | C | 0 | 5.27 |
| 4 | TH-2-t-butyl | D | − 7 | 5.01 |
| 5 | TH-2-t-butyl | E | − 5 | 5.01 |
| 6 | TH-2-t-butyl | F | 25 | 4.64 |
| 7 | TH-2-ethyl | A | 90 | 5.70 |
| 8 | TH-2-ethyl | B | 51 | 4.90 |
| 9 | TH-2-ethyl | C | 80 | 4.91 |
| 10 | TH-2-ethyl | D | 70 | 5.30 |
| 11 | TH-2-ethyl | E | 70 | 4.94 |
| 12 | TH-2-ethyl | F | 81 | 5.38 |
| 13 | TH-1-isopentyl-3-methyl | A | 35 | 10.63 |
| 14 | TH-1-isopentyl-3-methyl | B | −28 | 9.18 |
| 15 | TH-1-isopentyl-3-methyl | C | − 2 | 9.92 |
| 16 | TH-1-isopentyl-3-methyl | D | −10 | 9.99 |
| 17 | TH-1-isopentyl-3-methyl | E | −11 | 9.36 |
| 18 | TH-1-isopentyl-3-methyl | F | −19 | 9.46 |
| 19 | TH-1-(3 methylpentyl)-3-ethyl | A | 15 | 9/97 |

It is readily apparent from the data of Table 2 that the solubilities of the tetrahydro-1-alkylanthrahydroquinones of Formula III (Test Nos. 13–19) are at least about double those of tetrahydro-2-butylanthrahydroquinone and tetrahydro-2-ethylanthrahydroquinone in the corresponding solvents (Test Nos. 1–12). The higher solubilities shown of the Formula III compounds (Test Nos. 13–19) are particularly remarkable in that they generally are for saturation temperatures substantially lower than those for the solubilities of tetrahydro-2-t-butylanthrahydroquinone and tetrahydro-2-ethylanthrahydroquinone (Test Nos. 1–12) which are the tetrahydroanthrahydroquinone derivatives of the alkylanthraquinones heretofore most commonly preferred as working intermediates in commercial cyclic anthraquinone processes for producing hydrogen peroxide. In such processes, the concentration of the working intermediate is generally limited by the solubility in the chosen solvent of the anthrahydroquinone form of the intermediate. In view thereof, the common practice has been to employ as the working solvent a mixture of solvents which includes as a component thereof a solvent (such as diisobutylcarbinol, methylcyclohexyl acetate or trioctyl phosphate) of the type in which the nated to convert the anthraquinone completely to its anthrahydroquinone form, 10ml. of diethyl ether was added and the catalyst was then filtered off. In each case, 10 ml. of water was added and the mixture was oxidized by blowing a slow stream of air therethrough until the pale yellow color of the anthraquinone reappeared. The aqueous layer was separated and the organic layer was extracted twice with 10 ml. portions of water. The hydrogen peroxide content of the combined aqueous layers was determined by titration with ceric ammonium nitrate solution. The yields of hydrogen peroxide formed, based upon the amount of starting anthraquinone compound used, was then calculated. The results of the tests are reported in Table 3.

TABLE 3

HYDROGEN PEROXIDE YIELDS

| Test No. | Anthraquinone | Solvent | Yield of $H_2O_2$ % |
|---|---|---|---|
| 1 | 1-n-butyl | A of Ex 7 | 32.0 |
| 2 | 1-(isopentyl)-3-methyl | A of Ex 7 | 15.4 |
| 3 | 1-(3-methylpentyl))-3-ethyl | A of Ex 7 | 6.3 |
| 4 | TH-1-isopentyl-3-methyl | A of Ex 7 | 97.3 |
| 5 | TH-1-isopentyl-3-methyl | B of Ex 7 | 93.0 |
| 6 | TH-1-isopentyl-3-methyl | C of Ex 7 | 92.2 |
| 7 | TH-1-isopentyl-3-methyl | D of Ex 7 | 88.6 |
| 8 | TH-1-isopentyl-3-methyl | E of Ex 7 | 89.1 |
| 9 | TH-1-isopentyl-3-methyl | F of Ex 7 | 91.3 |
| 10 | TH-1-isopentyl-3-methyl | A of Ex 7 | 92.0 |

Because of the small scale of the tests whose results are reported in Table 3, the hydrogen peroxide yield values found are only approximate and probably somewhat on the low side due to mechanical losses in handling. Nevertheless, they show clearly that the 1-alkylanthraquinones of Formula II (Test Nos. 1–3) give hydrogen peroxide in relatively poor yield, probably because of excessive by-product formation. In contrast, the tetrahydro-1-alkylanthraquinones of Formula III (Test Nos. 4–10) produced hydrogen peroxide in high yields.

EXAMPLE 9

In a cyclic type operation, a solution of 2.0 parts of 5,6,7,8-tetrahydro-1-isopentyl-3-methylanthraquinone in 8.5 parts of p-xylene was hydrogenated under agitation in the presence of 0.22 parts of a finely divided palladium-on-alumina catalyst containing 0.45 percent metallic palladium until 51 % the theoretical amount of hydrogen was absorbed. The resulting solution was filtered to remove the catalyst, and the reaction flask and catalyst were washed with an additional 4.3 parts of p-xylene. After adding 50 parts of water to the combined washings and filtrate, oxygen was bubbled through the stirred mixture until the pale yellow color of the original anthraquinone compound reappeared. The resulting mixture consisted of an aqueous layer which contained the hydrogen peroxide produced and a xylene layer, which was a solution of the anthraquinone in xylene. The two layers were separated and the xylene layer was washed twice with 25 parts of water and the washings were added to the original aqueous layer. The hydrogen peroxide present in the combined washings and orignial aqueous layer, as determined by titration with ceric ammonium sulfate solution, represented a quantitative yield thereof based upon the hydrogen absorbed. The hydrogen peroxide produced was equivalent to an $H_2O_2$ concentration of 9.89 percent in the starting solution of the anthraquinone in xylene.

When the above xylene layer was similarly reduced, oxidized and extracted in a second cycle, and the then resulting xylene layer was similarly used in a third cycle, the yields of hydrogen peroxide obtained in the second and third cycles were substantially the same as that obtained in the first cycle.

Generally similar results are obtainable when the procedure of Example 9 is repeated using any of solvents B through F of Example 7 in place of p-xylene. Also, substantially similar results are obtainable when the procedure of Example 9 is repeated using any of the tetrahydro-1-alkylanthraquinones of Formula III in any of solvents A through F of Example 7.

The starting 1-(3-butenyl)anthraquinone of Example 1 was prepared by heating an equimolar solution of 1,3,7-octatriene and 1,4-naphthoquinone in ethanol at reflux for 5 hours, then stirring the solution overnight at 25°C. To the resulting solution of the Diels-Alder condensation product obtained, an amount of potassium hydroxide slightly in excess of the combined amounts of octatriene and naphthoquinone used was added, following which air was bubbled through the solution for 24 hours. The mixture was poured on ice, let stand 1 hour, then filtered and the filtrate was washed with water to obtain the anthroquinone in crude form. The latter was extracted with hot petroleum ether and the extract was evaporated to crystallize the 1-(3-butenyl)anthraquinone in the form of yellow needles. The 1,3,7-octatriene used in the synthesis of this material is conveniently prepared by the dimerization of 1,3-butadiene as described by Takashashi et al., Bull. Chem. Soc. Japan, 41, 454-460 (1968).

The starting 1-(3-ethyl-3-butenyl)-3-ethylanthraquinone of Example 2 was prepared by heating an equimolar mixture of 2,7-diethyl-1,3,7-octatriene and 1,4-naphthoquinone at 80°–100°C. for 1 hour in a nitrogen atmosphere. The crystallized reaction mixture obtained upon cooling was recrystallized from methanol to give the Diels-Alder adduct in the form of white needles. The latter were dissolved in an ethanolic solution of potassium hydroxide and oxidized by the passage of air through the solution. The resulting 1-(3-ethyl-3-butenyl)-3-anthraquinone which separated out was collected, washed with water and recrystallized from methanol in the form of yellow needles. The diethyloctatriene used in the synthesis of this anthraquinone was prepared by dimerizing 2-ethyl-1,3-butadiene. This was done by heating a 50 percent solution of the ethylbutadiene in acetone in the presence of about 1.2 percent of bis(triphenylphosphine)(maleic anhydride)palladium as catalyst at 110°C. for 9 hours under autogenous pressure. After distilling off the volatile materials at water pump vacuum, the residual reaction mixture was fractionally distilled to obtain 2,7-diethyl-1,3,7-octatriene as the fraction boiling at 44°-46°C., 0.75 mm. Hg.

The starting 1-(3-isopentenyl)-3-methylanthraquinone of Example 3 was prepared by heating a solution (about 60 percent) of an equimolar mixture of 2,7-dimethyl-1,3,7-octatriene and 1,4-naphthoquinone at reflux for 2 hours. The reacted mixture was cooled and the Diels-Alder adduct which crystallized out was dissolved in a solution (about 9 percent) of potassium hydroxide in a 11:100 volume mixture of water an ethanol. The resulting dark solution was oxidized by bubbling air therethrough for about 24 hours. Water was then added and the crude 1-(3-isopentenyl)-3-methylanthraquinone which separated was collected by filtration. This was dissolved in benzene, the solution was passed through a column of activated alumina, the eluate was evaporated and the resulting residue was recrystallized from methanol to give the above anthraquinone in the form of yellow needles. The dimethyloctatriene used in the synthesis of this anthraquinone was prepared by dimerizing isoprene (2-methyl-1,3-butadiene). This was done by heating a solution (about 50 percent) of isoprene in acetone in the presence of about 0.8 percent of bis(triphenylphosphine)(maleic anhydride)palladium as catalyst for 10 hours at 105°C. under autogenous pressure. After distilling off volatile materials at water pump vacuum, the residual reaction mixture was fractionally distilled to obtain the 2,7-dimethyl-1,3,7-octatriene as the fraction boiling at 66°C., 20 mm. Hg.

We claim:

1. In a cyclic process for producing hydrogen peroxide in which a working solution of an anthraquinone working intermediate in a water-immiscible solvent is hydrogenated in a reduction stage and the resulting solution of the anthrahydroquinone form of said intermediate is oxidized in an oxidation stage to regenerate said solution of the anthraquinone working intermediate for recycling to said reduction stage after the hydrogen peroxide simultaneously formed in said oxidation stage is removed from said working solution, the improvement comprising employing as said anthraquinone working intermediate a 5,6,7,8-tetrahydro-1-alkyl-9,10-anthraquinone of the formula

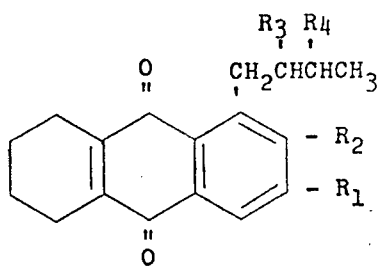

in which each of $R_1$, $R_2$, $R_3$ and $R_4$ is hydrogen or a 1 to 8 carbon straight chain alkyl hydrocarbon group.

2. The process of claim 1 in which the anthraquinone working intermediate is 5,6,7,8-tetrahydro-1-n-butyl-9,10-anthraquinone.

3. The process of claim 1 in which the anthraquinone working intermediate is 5,6,7,8-tetrahydro-1-isopentyl-3-methyl-9,10-anthraquinone.

4. The process of claim 1 in which the anthraquinone working intermediate is 5,6,7,8-tetrahydro-1-(3-methylpentyl)-3-ethyl-9,10-anthraquinone.

* * * * *